United States Patent [19]

Gerber

[11] Patent Number: 4,773,694
[45] Date of Patent: Sep. 27, 1988

[54] GOLF CART ENCLOSURE

[75] Inventor: Curtis E. Gerber, Tampa, Fla.

[73] Assignee: Tampa G Manufacturing Co., Tampa, Fla.

[21] Appl. No.: 20,963

[22] Filed: Mar. 3, 1987

[51] Int. Cl.$^4$ ............................................. B60J 7/24
[52] U.S. Cl. ...................................... 296/77.1; 296/83
[58] Field of Search ................... 296/78 R, 78 A, 136, 296/140, 141; 160/32, 19

[56] References Cited

U.S. PATENT DOCUMENTS

| | | | |
|---|---|---|---|
| 1,346,203 | 7/1920 | Hull | 296/140 |
| 1,444,413 | 2/1923 | Collins | 296/140 |
| 1,505,955 | 8/1924 | Nerron | 296/140 |
| 3,709,553 | 1/1973 | Churchill et al. | 296/78 R |
| 4,013,315 | 3/1977 | West | 296/83 |
| 4,098,536 | 7/1978 | Mills | 296/78 R |
| 4,621,859 | 11/1986 | Spicher | 296/78 R |
| 4,652,037 | 3/1987 | Than et al. | 296/78 R |

Primary Examiner—Robert R. Song
Attorney, Agent, or Firm—Dominik, Stein, Saccocio & Reese

[57] ABSTRACT

A golf cart enclosure for removable installation about a golf cart or similar vehicle to protect the occupants thereof from precipitation such as rainfall. The enclosure comprises a roof panel having a configuration corresponding to the configuration of the roof structure of the golf cart and front, rear and side panels suspended therefrom about the periphery of the golf cart to completely enclose the golf cart. The roof panel of the enclosure comprises a peripheral hem which allows each panel suspended therefrom to be folded and rolled upwardly and then tucked under the roof panel. The peripheral flap is then fastened to the rim of the roof structure of the golf cart.

6 Claims, 1 Drawing Sheet

GOLF CART ENCLOSURE

BACKGROUND OF THE INVENTION

1. Field of the Invention

This invention relates to golf carts and similar vehicles. More particularly, this invention relates to golf cart enclosures comprising curtains composed of transparent or translucent materials positioned about the periphery of the golf cart from the roof structure to the undercarriage thereof to protect the occupants of the golf cart from precipitation.

2. Description of the Background Art

Presently, there exist many types of golf cart enclosures designed to protect the occupants of the golf cart in the event of precipitation such as rain. Basically, these types of golf cart enclosures each comprises one or more sheets of translucent or transparent material which is affixed between the roof structure and the undercarriage of the golf cart. The panels are secured to adjacent panels by zippers or similar fasteners to allow passenger ingress and egress and to allow access to the golf clubs stored at the rear of the golf cart.

For example, U.S. Pat. No. 3,709,533 discloses a golf cart enclosure comprising a pair of transparent side curtains slidably suspended from a curtain mechanism affixed to the peripheral underside of the roof structure of a golf cart. The side curtains each extend around one-half of a golf cart and are affixed together at adjoining edges at the front and rear of the golf cart by means of snap fasteners. Similar snap fasteners are provided about the lower peripheral edge of the undercarriage of the golf cart to more securely retain the side curtain panels in their closed position about the periphery of the golf cart. U.S. Pat. No. 4,013,315 discloses related side curtain panels positioned about the peripheral sides of a golf cart and secured into position by means of suction cups removably fastened to the roof of the cart. Finally, U.S. Pat. No. 4,098,536 discloses still another golf cart enclosure composed essentially of a unitary structure designed to be placed over the roof of a golf cart with its side panels extending downwardly about the periphery of the golf cart. A zippered opening is provided to allow ingress and egress to the golf cart.

All of the aforementioned golf cart enclosures function to protect the occupants in the event of precipitation or inclement weather. However, during good weather conditions, the enclosures are cumbersome to store in such manner that the enclosures do not interfere with the free ingress and egress to the golf cart or otherwise obstruct the open air view of the occupants of the golf cart. Specifically, the enclosures disclosed in the first two mentioned patents contemplate sliding the panels leftwardly or rightwardly in a curtain fashion and then using tie straps to tie the curtains together about the upstanding roof supports of the golf cart. While both enclosures may eventually be removed from the curtain assembly or from the roof structure by means of the suction cups, respectively, such removal procedures are time consuming. The enclosure disclosed in U.S. Pat. No. 4,098,536 may entirely be removed from a golf cart in an apparent quick and easy manner. However, in regard to all three types of enclosures, once the enclosures are removed, the bulky material constituting the enclosures must be stored somewhere on or in the cart for subsequent use. Storage of such bulky material is usually cumbersome or otherwise interferes with the otherwise roomy and unobstructed open air view of the golf cart.

Therefore, it is an object of this invention to provide an apparatus which overcomes the aforementioned inadequacies of the prior art devices and provides an improvement which is a significant contribution to the advancement of the golf cart enclosure art.

Another object of this invention is to provide a golf cart enclosure having suspended translucent or transparent panels to protect the occupants of the golf cart from precipitation.

Another object of this invention is to provide a golf cart enclosure which may be easily mounted to the roof structure of a typical golf cart and left in place without obstruction or interference with the open air view of the occupants.

Another object of this invention is to provide a golf cart enclosure mounted to the roof structure of a golf cart including a roof panel and front and side panels suspended therefrom which may be simply rolled up and tucked under the roof panel during good weather conditions and then during inclement weather, simply unrolled from underneath the roof panel to protect the occupants of a golf cart from precipitation.

The foregoing has outlined some of the more pertinent objects of the invention. These objects should be construed to be merely illustrative of some of the more prominent features and applications of the intended invention. Many other beneficial results can be obtained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

The invention is defined by the appended claims with a specific embodiment shown in the attached drawings. For the purpose of summarizing the invention, the invention comprises a golf cart enclosure for removable installation about a golf cart or similar vehicle to protect the occupants thereof from precipitation such as rainfall. More particularly, the enclosure comprises a roof panel having a configuration corresponding to the configuration of the roof structure of a golf cart and front, rear and side panels suspended therefrom about the periphery of the golf cart to completely enclose the golf cart to protect the occupants thereof from precipitation. Zippers or similar fasteners are provided along the lines of the panels to allow passenger ingress and egress from the golf cart.

The novel feature of this invention comprises peripheral flap hem means positioned about the periphery of the roof panel of the enclosure which allows each panel suspended therefrom to be folded and rolled upwardly and then tucked under the roof panel whereupon the flap is fastened to the rim of the golf cart. Complete roll up and tuck in of each panel about the periphery of the roof panel of the enclosure results in the entire enclosure being stored on top of the roof structure of a golf cart where it is completely out of the way of the occupants of the vehicle, thereby not obstructing the view of the occupants or otherwise interfering with their free movement. Moreover, in the event of imminent inclement weather, the rolled up panels may be quickly unfolded from under the peripheral flaps of the roof panel of the enclosure and suspended therefrom to protect the occupants from precipitation. Further, should the enclosure become soiled or otherwise require cleaning, the entire enclosure may be quickly and easily removed from the roof structure of the cart for cleaning and then quickly and easily reinstalled.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
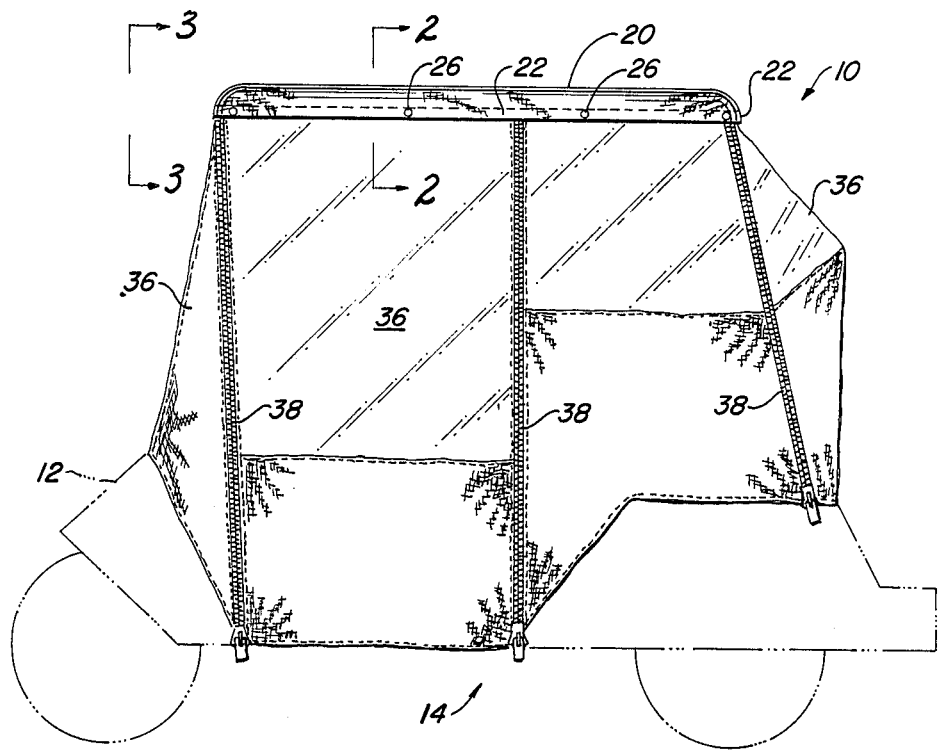
FIG. 1 is a side view of the golf cart enclosure of the invention installed over the roof structure of a conventional golf cart shown in phantom.
Figure 2:
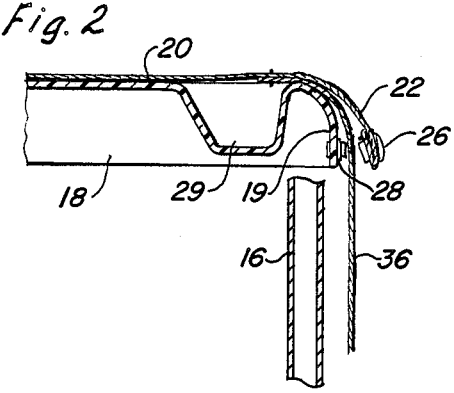
FIG. 2 is a cross-sectional view of FIG. 1 along lines 2—2 illustrating the configuration of a roof structure of a golf cart and the manner in which the enclosure of the invention is fitted thereover.

Referring to FIG. 1, the golf cart enclosure 10 of the invention is designed to be fitted over a conventional golf cart, generally indicated by numeral 12, to protect the occupants thereof from inclement weather such as precipitation. More particularly, a conventional golf cart 12 typically comprises a wheeled carriage 14 having four upstanding corner supports 16 supporting a roof structure 18. With reference to FIG. 2, a typical roof structure 18 comprises a generally flat domeshaped cross-sectional configuration with channel 19 positioned about its periphery. The roof structure 18 is rigidly affixed at its corners to its respective upstanding roof supports 16.

The enclosure 10 of the invention comprises a generally flat roof panel 20 having a downwardly depending hem portion 22 extending about its periphery to correspond to the configuration of the rim 19 of the roof structure 18. A plurality of snaps 26 are sewn or otherwise affixed to the hem portion 22 of the enclosure 10 for removable fastening with corresponding snaps 28 affixed to the roof structure 18. A plurality of panels 36 are sewn or otherwise securely fastened to the inside of the hem portion 22 of the enclosure 10 to be suspended thereby about the periphery of the enclosure 10 to protect the occupants thereof from precipitation. The panels 36 are removably secured to adjoining panels by means of zippered openings 38 to provide ingress and egress to the occupants of the cart 12. Panels 36 are preferably transparent in customary window areas such as the front and the upper sides and rear, and translucent in other areas such as the lower sides and rear as is customary with prior art enclosures.

Figure 3:
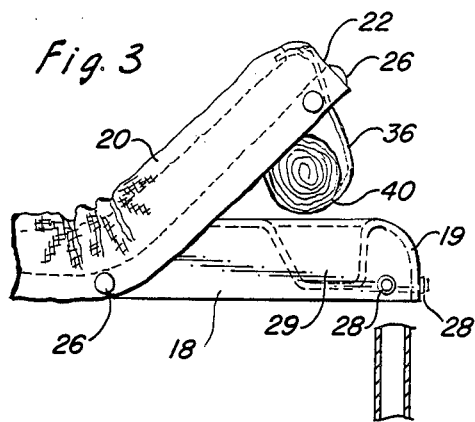
FIG. 3 is a partial side view illustrating the manner in which each panel is rolled upwardly and then folded under the peripheral edge of the roof panel of the enclosure allowing the roof panel to then be reaffixed to the roof structure of the cart.

As shown in FIG. 3, each panel may be folded inwardly along its bottom edge to assure a width no greater than the width of the uppermost portion of the panel 36 and then tightly rolled upwardly to form a bight, generally indicated by numeral 40. The bight 40 of folded and rolled panel 36 may then be folded under the peripheral edge of the roof panel 20 and deposited within channel 29 formed about the periphery of the roof 18. After the bight 40 is folded under the roof panel 20, the hem portion 22 may then be reaffixed to the rim portion 19 of the roof structure 18 by means of snaps 26 and 28. It is noted that the bights 40 formed at the corners of the roof panel 20 of the enclosure 10 will overlap one another, but may be smoothed over by hand to create an esthetic appearance. It is also noted that since some golf cart roofs 18 may not include peripheral channels 29, the enclosure 10 may still be utilized by folding, as opposed to rolling, each side panels 36 in flat bights and then tucking under the roof panel 20.

During imminent inclement weather, such as precipitation, the panels 36 may be lowered by simply unfastening the peripheral edge of the roof panel 20 at tabs 24 and flaps 30, untucking the bight 40 of folded and rolled panels 36 therefrom, and then unrolling the bight 40 until the panels 36 are completely suspended from the roof panel 20 about the periphery of a golf cart 12 while zippered openings 38 allow ingress and egress to the occupants of the cart 12. It is noted that entire enclosure 10 may be completely removed from the golf cart 12 for cleaning in the event that the panels 36 and 20 become soiled.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit of the invention.

Now that the invention has been described,
What is claimed is:

1. An enclosure for a golf cart or other vehicle having a roof structure secured above a body portion of the vehicle, the enclosure comprising in combination:
    a roof panel having an underside corresponding to the configuration of the roof structure of a golf cart;
    said roof panel including a hem portion positioned about its periphery corresponding to the peripheral configuration of the roof structure of the golf cart;
    a plurality of panels each having an upper edge portion for suspension from the periphery of said roof panel about the periphery of the golf cart;
    means for suspending said upper edge portions of said panels to said underside of said roof panel; and securing means positioned about the periphery of said roof panel allowing a bight of each of said panels to be positioned under the periphery of said roof panel and then said periphery secured to the roof structure of a golf cart.

2. The enclosure as set forth in claim 1, wherein said suspension means comprises fastening said upper edge portions of said panels to said hem portion.

3. The enclosure as set forth in claim 1, wherein said securing means comprises a plurality of snaps affixed to said hem of said roof panel about its periphery for removable engagement with the roof structure of the golf cart.

4. The enclosure as set forth in claim 3, further including fastener means positioned between adjacent said suspended panels allowing ingress and egress to the golf cart.

5. The enclosure as set forth in claim 4, wherein said fastener means comprises a zipper.

6. The enclosure as set forth in claim 1, wherein said periphery of said roof panel includes a channel into which said bight of suspended panels is deposited.

* * * * *